United States Patent
Kosarev et al.

(10) Patent No.: US 9,347,205 B2
(45) Date of Patent: May 24, 2016

(54) ESTIMATION OF THE RELATIVE ATTITUDE AND POSITION BETWEEN A VEHICLE BODY AND AN IMPLEMENT OPERABLY COUPLED TO THE VEHICLE BODY

(75) Inventors: Alexey Andreevich Kosarev, Moscow (RU); Alexey Vladislavovich Zhdanov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 14/125,361

(22) PCT Filed: Feb. 10, 2012

(86) PCT No.: PCT/RU2012/000088
§ 371 (c)(1),
(2), (4) Date: Jan. 23, 2014

(87) PCT Pub. No.: WO2013/119140
PCT Pub. Date: Aug. 15, 2013

(65) Prior Publication Data
US 2014/0207331 A1    Jul. 24, 2014

(51) Int. Cl.
*E02F 3/84* (2006.01)
*E02F 9/26* (2006.01)
(Continued)

(52) U.S. Cl.
CPC ............... *E02F 9/264* (2013.01); *E02F 3/845* (2013.01); *G05D 1/0891* (2013.01); *G01P 15/00* (2013.01)

(58) Field of Classification Search
CPC ......... E02F 3/845; E02F 9/264; G05D 1/0891
See application file for complete search history.

(56) References Cited

U.S. PATENT DOCUMENTS 4,157,118 A * 6/1979 Suganami et al. ............. 172/4.5
5,860,480 A * 1/1999 Jayaraman et al. ............ 172/2
(Continued)

FOREIGN PATENT DOCUMENTS

DE      19815894 A1    10/1998
EP       1630636 A2     3/2006
(Continued)

OTHER PUBLICATIONS

International Search Report and Written Opinion dated Nov. 15, 2012, issued for corresponding application No. PCT/RU2012/000088, 6 pgs.

*Primary Examiner* — Todd Melton
(74) *Attorney, Agent, or Firm* — Chiesa Shahinian & Giantomasi PC

(57) ABSTRACT

An implement having an implement acceleration is operably coupled to a vehicle body having a body acceleration. An attitude of the implement is estimated by receiving acceleration measurements from an accelerometer mounted on the vehicle body and an accelerometer mounted on the implement. A state vector estimate is calculated based at least in part on the body acceleration measurement and the implement acceleration measurement. The state vector estimate includes a representation of the attitude of the implement relative to the vehicle body. In addition to the accelerometer measurements, angular velocity measurements can be received from a gyro mounted on the vehicle body and a gyro mounted on the implement. The state vector estimate is then calculated based at least in part on the body acceleration measurement, the implement acceleration measurement, the body angular velocity measurement, and the implement angular velocity measurement.

39 Claims, 8 Drawing Sheets

(51) Int. Cl.
*G05D 1/08* (2006.01)
*G01P 15/00* (2006.01)

(56) References Cited

U.S. PATENT DOCUMENTS

| | | | |
|---|---|---|---|
| 7,317,977 B2 * | 1/2008 | Matrosov | 701/50 |
| 8,412,418 B2 * | 4/2013 | Kumagai et al. | 701/50 |
| 8,571,762 B2 * | 10/2013 | McAree et al. | 701/50 |
| 8,655,588 B2 * | 2/2014 | Wong et al. | 701/500 |
| 8,738,242 B2 * | 5/2014 | Konno et al. | 701/50 |
| 2010/0012154 A1 | 1/2010 | Bitter et al. | |
| 2010/0299031 A1 | 11/2010 | Zhdanov et al. | |
| 2011/0313650 A1 * | 12/2011 | Tom | 701/200 |
| 2012/0016623 A1 * | 1/2012 | Hayner | 702/141 |
| 2013/0158819 A1 * | 6/2013 | Callaway | 701/50 |

FOREIGN PATENT DOCUMENTS

| | | |
|---|---|---|
| EP | 2187166 A2 | 5/2010 |
| JP | 2010117230 A | 5/2010 |
| SU | 940651 A | 6/1982 |

\* cited by examiner

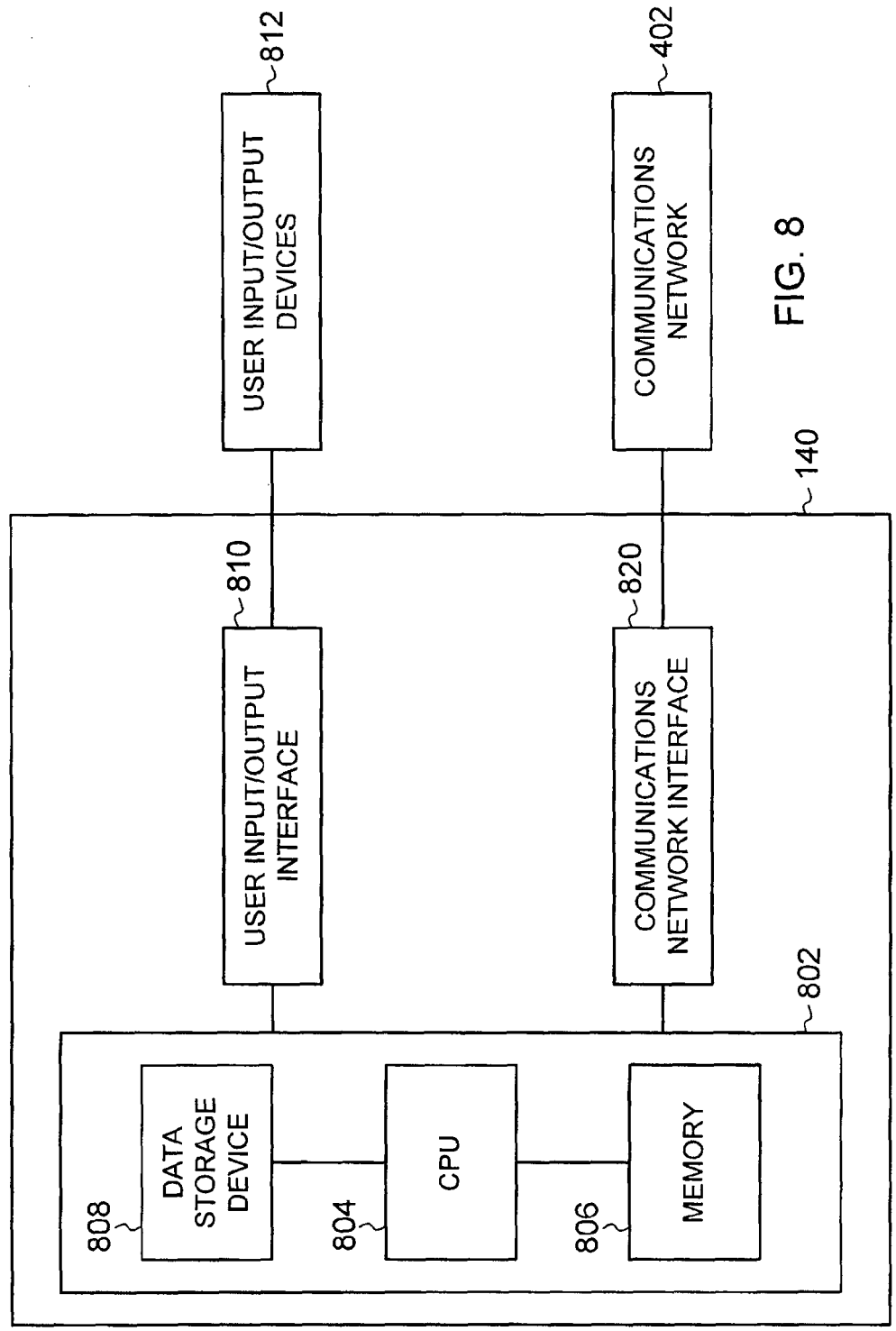

ESTIMATION OF THE RELATIVE ATTITUDE AND POSITION BETWEEN A VEHICLE BODY AND AN IMPLEMENT OPERABLY COUPLED TO THE VEHICLE BODY

BACKGROUND OF THE INVENTION

The present invention relates generally to control of an implement operably coupled to a body of a vehicle, and more particularly to the estimation of the attitude and position of the implement relative to the body of the vehicle.

In various grading applications with a dozer, it is necessary to control the position and attitude of the dozer blade. Accurate measurements of the position and attitude of the dozer blade are required for accurate control. Most of the control systems available on the market today use direct measurements of these parameters. The position of the dozer blade can be measured, for example, with a Global Navigation Satellite System (GNSS) receiver or a laser system. In these systems, a mast is installed on the dozer blade to support a GNSS antenna, a laser prism, or a laser receiver. The attitude of the dozer blade can be measured, for example, with two GNSS antennas, two laser prisms, or two laser receivers. Each GNSS antenna, laser prism, or laser receiver is supported by an individual mast installed on the dozer blade. Other sensors, such as a fluid slope sensor, can be used to measure the attitude of the dozer blade.

Other sensors can be mounted on the dozer blade. A magnetic sensor, for example, can be used to estimate yaw. A magnetic sensor, however, is very sensitive to the local magnetic anomalies induced by the dozer itself and by magnetic objects (such as iron objects) near the dozer. Calibration of the magnetic sensor can remove the influence of the dozer but not the influence of magnetic objects near the dozer. The accuracy of yaw estimation with a magnetic sensor, consequently, is typically not better than few arc degrees, even when a gyro is used for filtering magnetic sensor measurements. A magnetic sensor, therefore, is typically used only for a vehicle that moves on a surface with a slope less than a predetermined maximum value (which is dependent on the required grading accuracy for a particular application) and for applications in which a yaw error of a few degrees is acceptable.

Many of the above-mentioned sensors, when mounted on the dozer blade, however, are not robustly protected from harsh environmental conditions, including shock, vibration, and impact with soil, stones, and rocks. Sensors mounted on a mast, in particular, are exposed and susceptible to damage. For a GNSS antenna mounted on the dozer blade, furthermore, the coax cable running from the GNSS antenna to the navigation receiver, typically located in the dozer cabin, is susceptible to damage.

To eliminate reliability issues associated with sensors mounted on the dozer blade, some measurement systems use only sensors mounted on the dozer body, preferably within the interior of the mainframe, inside the cabin, or on the roof of the cabin. The optimal location for mounting position sensors, such as a GNSS antenna, a laser prism, or a laser receiver, is on the roof of the cabin. To calculate the position of the dozer blade from the measured position of the cabin, the attitude of the dozer body relative to the ground and the position of the dozer blade relative to the dozer body need to be estimated. The attitude of the dozer body can be estimated by various combinations of inertial measurement units, GNSS antennas, laser prisms, and laser receivers.

European Patent Application Publication No. EP 2 187 166 discloses using video cameras mounted on the dozer body to estimate the dozer blade position relative to the dozer body by tracking special passive or active targets mounted on the dozer blade. The video cameras, however, require a stable mechanical environment for proper operation. The camera system is also sensitive to lighting conditions and fog, dust, and dirt in the optical path between the cameras and the targets. Infrared cameras can be used to overcome issues arising from light sensitivity; however, fog, dust, and dirt remain problematic.

In another approach for determining the attitude and position of the dozer blade, the kinematic structure of the dozer is modelled as a system of lever arms, pivots, and extended cylinders. In this model, the position of the dozer blade relative to the dozer body can be calculated if all lever arms (distance between pivot points) of the blade suspension is known. Lever arms of constant length can be easily measured directly or read out from mechanical drawings.

To measure cylinder extension, a linear displacement sensor based on a potentiometric sensor or a magnetorestrictive sensor can be used. A linear displacement sensor mounted on the outside of a cylinder, however, typically does not operate reliably and can be easy damaged by soil, stones, or rocks. Placement of a linear displacement sensor inside a cylinder overcomes reliability issues. Standard commercial cylinders for construction machines, however, are not outfitted with internal linear displacement cylinders; and retrofitting existing construction machines with custom cylinders is an expensive and time-consuming operation.

A robust method for determining the attitude and position of a dozer blade, or other implement, in which sensors can operate reliably under harsh environmental conditions, is desirable.

BRIEF SUMMARY OF THE INVENTION

An implement is operably coupled to a vehicle body. The implement has an implement acceleration, and the vehicle body has a body acceleration. An attitude of the implement is estimated by receiving a body acceleration measurement from a body accelerometer mounted on the vehicle body and an implement acceleration measurement from an implement accelerometer mounted on the implement. A state vector estimate is calculated based at least in part on the body acceleration measurement and the implement acceleration measurement. The state vector estimate includes a representation of the attitude of the implement relative to the vehicle body.

In an embodiment, in addition to the body acceleration measurement and the implement acceleration measurement, a body angular velocity measurement is received from a body gyro mounted on the vehicle body and an implement angular velocity measurement is received from an implement gyro mounted on the implement. A state vector estimate is calculated based at least in part on the body acceleration measurement, the implement acceleration measurement, the body angular velocity measurement, and the implement angular velocity measurement. The state vector estimate includes a representation of the attitude of the implement relative to the vehicle body.

These and other advantages of the invention will be apparent to those of ordinary skill in the art by reference to the following detailed description and the accompanying drawings.

BRIEF DESCRIPTION OF THE DRAWINGS

FIG. 8 shows a schematic of a controller unit.

DETAILED DESCRIPTION

Figure 1:
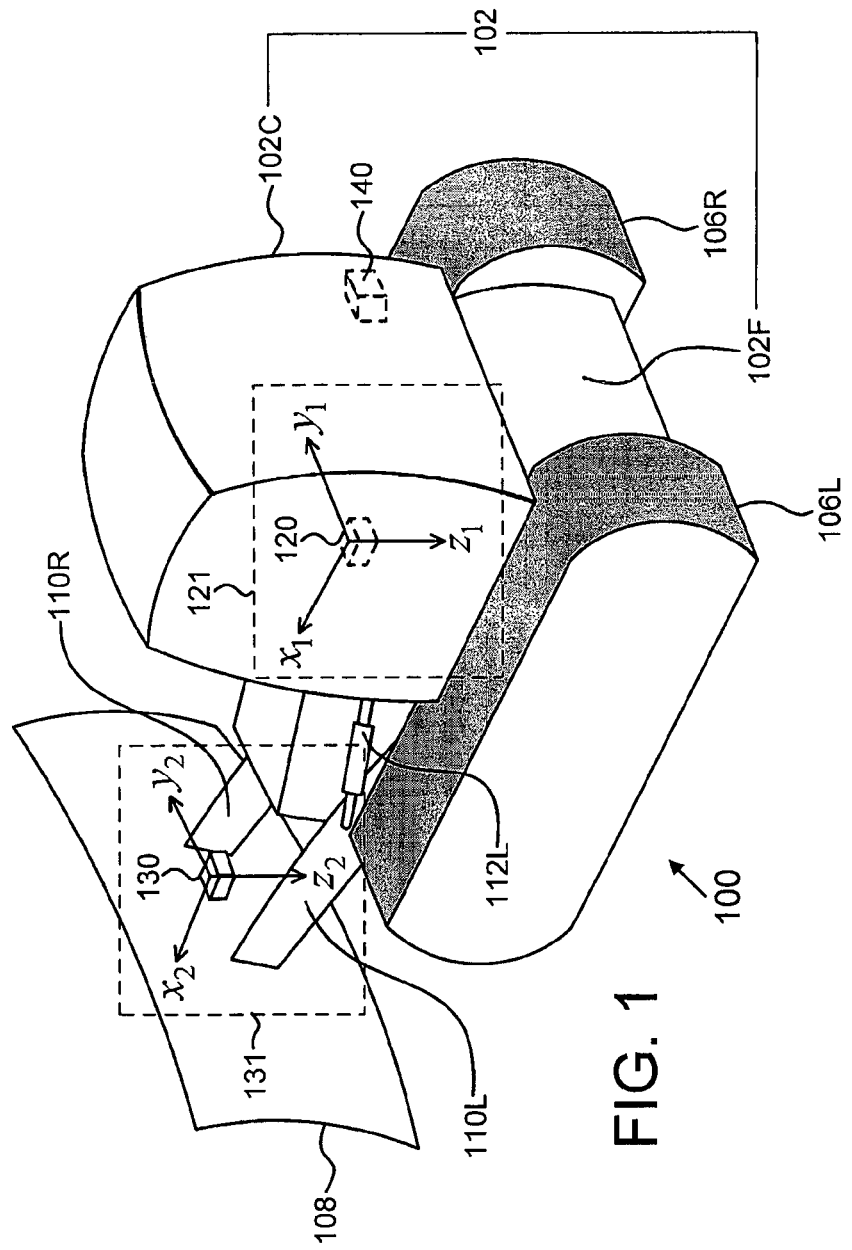
FIG. 1 shows a schematic of a dozer.

FIG. 1 shows a schematic of a dozer 100, which includes a dozer body 102 and a dozer blade 108. The dozer body 102 includes a mainframe 102F and a cabin 102C, in which the operator sits. The dozer 100 travels across ground via a left track 106L and a right track 106R. The dozer blade 108 is operably coupled to the dozer body 102 via a left support arm 110L and a right support arm 110R.

The dozer blade 108 can move relative to the dozer body 102. In general, both the position and the attitude (angular orientation) of the dozer blade 108 relative to the dozer body 102 can be controlled. Movement of the left support arm 110L is controlled by a left hydraulic cylinder 112L; movement of the right support arm 110R is controlled by a corresponding right hydraulic cylinder (not shown). The hydraulic cylinders can be controlled manually by an operator or automatically by a computer control system.

For grading operations, parameters such as the height of the dozer blade above the ground and the slope of the dozer blade relative to the ground are controlled. A system-state estimate system computes an estimate of the current system state and generates a feedback signal corresponding to the estimate of the current system state. In a manual control system, the feedback signal is inputted into a display system that displays the current values of the dozer blade parameters (such as the height and the slope of the dozer blade) on a screen, and an operator manually adjusts the dozer blade to achieve and maintain the desired (target) values of the dozer blade parameters. In an automatic control system, the feedback signal is transformed into a control signal that is used by a hydraulic control system to automatically control the height and the slope of the dozer blade.

The geometrical configurations of dozers and the degrees of freedom of the dozer blade relative to the dozer body vary among different models of dozers. In the most general case, a dozer blade can have up to six degrees of freedom (three angular rotations varying the relative attitude between the dozer blade and the dozer body and three translations varying the relative position between the dozer blade and the dozer body). In most cases, a dozer is equipped with a 4-way blade or a 6-way blade. A 4-way blade has two degrees of freedom: lift and tilt. The lift is adjustable in two ways (up and down), and the tilt is adjustable in two ways (clockwise and counter-clockwise). A 6-way blade has three degrees of freedom: lift, tilt, and angle. The lift is adjustable in two ways (up and down), the tilt is adjustable in two ways (clockwise and counter-clockwise), and the angle is adjustable in two ways (left and right).

In practice, the parameters of the dozer blade to be controlled depends on the application. If the application requires control of only the slope of the dozer blade (relative to the ground; see further discussion below), then an estimate of the dozer blade attitude relative to the dozer body is sufficient. If the application requires control of both the slope of the dozer blade and the position of the dozer blade (relative to the ground; see further discussion below), then both an estimate of the dozer blade attitude relative to the dozer body and an estimate of the dozer blade position relative to the dozer body are needed.

If the dozer blade has no more than three degrees of freedom, an estimate of the dozer blade position relative to the dozer body can be calculated from the estimate of the dozer blade attitude relative to the dozer body. If the dozer blade has more than three degrees of freedom, additional measurements (such as the attitudes of support arms), along with the estimate of the dozer blade attitude relative to the dozer body, are needed to determine an estimate of the dozer blade position relative to the dozer body. Algorithms for calculating an estimate of the dozer blade position relative to the dozer body based on an estimate of the dozer blade attitude relative to the dozer body and based on geometrical parameters are well-known in the art and are not described in further detail herein.

Values of the dozer blade attitude and the dozer blade position relative to the dozer body can then be used in combination with values of the dozer body attitude and the dozer body position relative to a local or geodetic coordinate system to calculate the values of the dozer blade attitude and the dozer blade position relative to the local or geodetic coordinate system. Values of the dozer body attitude and the dozer body position relative to a local or geodetic coordinate system can be calculated from sensors such as GNSS antennas, laser prisms, and laser receivers. Algorithms for calculating the values of the dozer blade attitude and the dozer blade position relative to the local or geodetic coordinate system are well known to those skilled in the art and are not discussed in further detail herein.

Values of the dozer blade attitude and the dozer blade position relative to the local or geodetic coordinate system can then be used to generate a feedback signal in a manual blade control system or an automatic blade control system. Algorithms for generating a feedback signal from values of the dozer blade attitude and the dozer blade position relative to the local or geodetic coordinate system are well known to those skilled in the art and are not discussed in further detail herein. As discussed above, depending on the application, different parameters of the dozer blade can be controlled; the feedback signal depends on the parameters to be controlled.

In an embodiment of the invention, an estimate of the current system state is computed based on measurements from inertial sensors mounted on the dozer body and on the dozer blade. In an advantageous embodiment, an estimate of the current system state is computed based on measurements from two inertial measurement units (IMUs), as described in more detail below.

Shown in FIG. 1 are two Cartesian reference frames. A system with three relative degrees of freedom is described first; systems with fewer degrees of freedom are described below. The body frame 121 is fixed with respect to the dozer body 102 and is defined by three orthogonal axes (FIG. 2A): $x_1$-axis 221, $y_1$-axis 223, and $z_1$-axis 225. The $x_1$-axis is directed along the roll axis of the dozer body 102; the $y_1$-axis is directed along the pitch axis of the dozer body 102; and the $z_1$-axis is directed along the yaw axis of the dozer body 102. Each angle is measured counter-clockwise about the respective positive axis (right-hand rule).

The blade frame 131 is fixed with respect to the dozer blade 108 and is defined by three orthogonal axes (FIG. 2B): $x_2$-axis 231, $y_2$-axis 233, and $z_2$-axis 235. The $x_2$-axis is directed along the roll axis of the dozer blade 108; the $y_2$-axis is directed along the pitch axis of the dozer blade 108; and the $z_2$-axis is directed along the yaw axis of the dozer blade 108.

Figure 3:
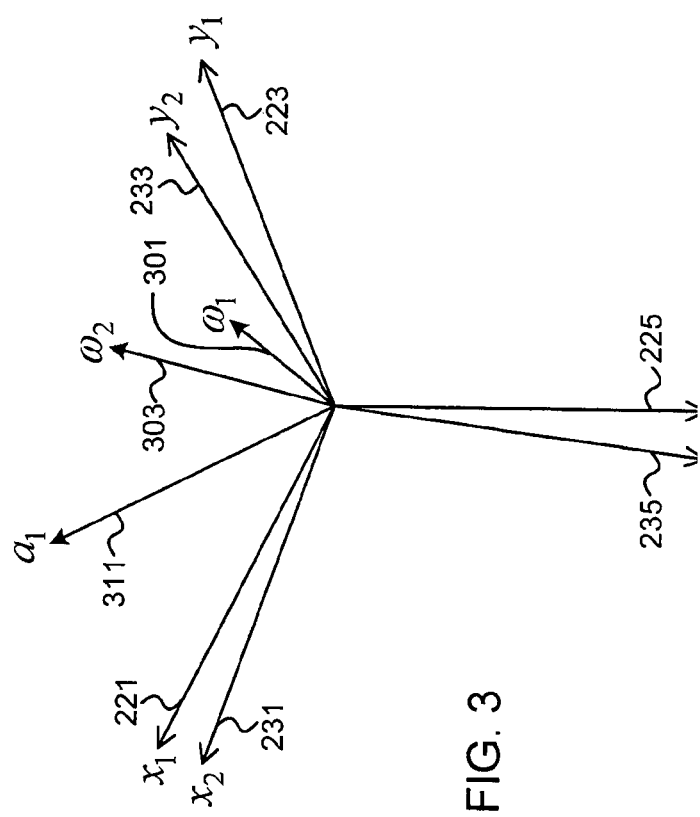
FIG. 3 shows a reference vector diagram.

Refer to the vector diagram in FIG. 3. The dozer body 102 moves with an acceleration vector $a_1$ 311 and an angular velocity vector $\omega_1$ 301. The acceleration vector $a_1$ 311 is the sum of the gravitational acceleration vector g and the dynamic acceleration vector of the dozer body 102. The acceleration vector $a_1$ 311 and the angular velocity vector $\omega_1$ 301 are measured with respect to the body frame 121. The dozer blade 108 moves with an angular velocity vector $\omega_2$ 303, which is measured with respect to the blade frame 131. The acceleration vector of the dozer blade 108 is discussed below.

The measurement vector of the dozer system includes two accelerations:

the dozer body acceleration vector, projected onto the axes of the body frame:

$$a_{1_1}=[a_{1x_1}, a_{1y_1}, a_{1z_1}]^T \quad (E1)$$

the dozer blade acceleration vector, projected onto the axes of the blade frame:

$$a_{2_2}=[a_{2x_2}, a_{2y_2}, a_{2z_2}]^T \quad (E2)$$

and two angular velocities:

the dozer body angular velocity vector, projected onto the axes of the body frame:

$$\omega_{1_1}=[\omega_{1x_1}, \omega_{1y_1}, \omega_{1z_1}]^T \quad (E3)$$

the dozer blade angular velocity vector, projected onto the axes of the blade frame:

$$\omega_{2_2}=[\omega_{2x_2}, \omega_{2y_2}, \omega_{2z_2}]^T. \quad (E4)$$

Note: The transpose T is used because the vectors are column vectors.

The measurement vector of the dozer system is written as:

$$Z=[a_{1x_1}, a_{1y_1}, a_{1z_1}, a_{2x_2}, a_{2y_2}, a_{2z_2}, \omega_{1x_1}, \omega_{1y_1}, \omega_{1z_1}, \omega_{2x_2}, \omega_{2y_2}, \omega_{2z_2}]^T. \quad (E5)$$

The dozer blade acceleration vector $a_2$ is the sum of the dozer body acceleration vector $a_1$ and the dozer blade acceleration vector relative to the dozer body, $a_{21}$:

$$a_2 = a_1 + a_{21}. \quad (E6)$$

In the process of grading, the dozer blade acceleration relative to the dozer body, $a_{21}$ is typically much smaller than the dozer body acceleration; therefore, it can be assumed that the dozer blade acceleration is approximately equal to the dozer body acceleration:

$$a_2 \cong a_1. \quad (E7)$$

The dozer blade attitude relative to the dozer body can be represented in one of three following forms:

three Euler angles: roll, pitch, and yaw ($\phi$, $\theta$, $\psi$);
direct cosine matrix (DCM) A;
rotation quaternion $$q=[q_0, q_1, q_2, q_3], (q_0^2 + q_1^2 + q_2^2 + q_3^2 = 1). \quad (E8)$$

The embodiment described below uses a rotation quaternion as the representation of the dozer blade attitude relative to the dozer body. One skilled in the art can develop embodiments in which Euler angles or DCM are used as the attitude representation.

Using the rotation quaternion q as the attitude representation, the acceleration vector, projected onto the axes of the body frame, is written as:

$$a_{1_1} \cong a_{2_1} = q a_{2_2} q^{-1}. \quad (E9)$$

The dozer blade angular velocity vector, projected onto the axes of the body frame, is written as:

$$\omega_{2_1} = q \omega_{2_2} q^{-1}. \quad (E10)$$

The dozer blade angular velocity vector relative to the dozer body, projected onto the axes of the body frame, is written as:

$$\omega_{21_1} = q \omega_{2_2} q^{-1} - \omega_{1_1}. \quad (E11)$$

A system is described by a time-dependent model. For example, the time-dependent system model can be represented by the following differential equation, in which the time-derivative of the system state vector is a function of the system state vector:

$$\dot{\chi} F(\chi), \quad (E12)$$

where $\chi$ represents the system state vector, and $\dot{\chi}$ represents the derivative of $\chi$ with respect to time t. If the system state vector $\chi(t)$ at time t is known, the system state vector at a time $t+\Delta t$, where $\Delta t$ is a time increment, can be predicted by using (E12) as follows:

$$\chi(t+\Delta t) \cong \chi(t) + F(\chi(t))\Delta t \quad (E13)$$

At discrete time epochs $t_0, t_1, \ldots, t_k = t_0, t_0 = \Delta t, \ldots, t_0 + k\Delta t$, where k is an integer, (E13) can be expressed as the following difference equation:

$$\chi(t_{k+1}) \cong \chi(t_k) + F(\chi(t_k))\Delta t. \quad (E14)$$

(E14) can be rewritten in compact notation as:

$$\chi_{k+1} \cong f(\chi_k). \quad (E15)$$

If $\Delta t$ is small, then:

$$\chi_{k+1} = f(\chi_k). \quad (E16)$$

As discussed below, the extended Kalman filter procedure is used for calculating the estimate of the rotation quaternion. A brief summary of the extended Kalman filter procedure is first presented; specific application for calculating the estimate of the rotation quaternion is then described.

In the extended Kalman filter procedure, the following system equations are used for discrete time:

$$\chi_{k+1} = f(\chi_k) + w_k \quad (E17)$$

$$Z_k = h(\chi_k) v_k \quad (E18)$$

where:
$\chi$ = system state vector;
w = process noise vector;
Z = measurement vector;
v = measurement noise vector; and
h = a generalized function.

The process noise vector w has a covariance matrix Q; and the measurement noise vector v has a covariance matrix R.

To estimate the system state vector $\chi$ from the measurement vector Z, the following extended Kalman filter procedure is used. At the k-th time epoch, the following Jacobian matrices are calculated:

$$A_k, a_{k[i,j]} = \partial f(\chi_k)_{[i]} / \partial \chi_{[i]}; \quad (E19)$$

$$H_k, H_{k[i,j]} = \partial h(\chi_k)_{[i]} / \partial \chi_{[i]}. \quad (E20)$$

The system state vector estimate is updated by a new measurement vector $Z_k$ as follows:

$$K_k = P_k H_k^T (H_k P_k H_k^T R_k)^{-1} \quad (E21)$$

$$\hat{Z}_k = h(\hat{\chi}_k) \quad (E22)$$

$$\chi_k = \hat{\chi}_k + K_k (Z_k - \hat{Z}_k), \quad (E23)$$

where:
P = state vector estimate covariance matrix; and
K = Kalman gain.

The symbol $\hat{\chi}$ denotes an estimate of $\chi$.

The new state vector estimate is then predicted using the system equations:

$$\hat{\chi}_{k+1} = f(\chi_k) \quad \text{(E24)}$$

$$P_{k+1} = A_k P_k A_k^T + Q_k. \quad \text{(E25)}$$

Return now to the specific problem of calculating an estimate of the rotation quaternion. If the dozer blade angular velocity relative to the dozer body is known, the rotation quaternion change can be predicted using the following differential equation for the rotation quaternion:

$$\dot{q}(t) = \frac{1}{2} \begin{bmatrix} -q_1(t) & -q_2(t) & -q_3(t) \\ q_0(t) & -q_3(t) & q_2(t) \\ q_3(t) & q_0(t) & -q_1(t) \\ q_2(t) & q_1(t) & q_0(t) \end{bmatrix} \cdot \begin{bmatrix} \omega_{21x_1}(t) \\ \omega_{21y_1}(t) \\ \omega_{21z_1}(t) \end{bmatrix}. \quad \text{(E26)}$$

(E26) is a specific instance of the general equation (E12).

The following extended Kalman filter procedure is used for calculating the estimate of the rotation quaternion $\hat{q}$. A state vector of the dozer system includes the rotation quaternion, the dozer body acceleration, the dozer body angular velocity, and the dozer blade angular velocity relative to the dozer body. The state vector can include other components as well. The state vector of the dozer system is written as:

$$X = [q_0, q_1, q_2, q_3, a_{1x_1}, a_{1y_1}, a_{1z_1}, \omega_{1x_1}, \omega_{1y_1}, \omega_{1z_1}, \omega_{21x_1}, \omega_{21y_1}, \omega_{21z_1}]^T. \quad \text{(E27)}$$

Once the state vector X has been determined, the quaternion is extracted from components of the state vector.

For the extended Kalman filter procedure, the initial estimate of the state vector is required at the start up of the system. The state vector can be initialized by the identity rotation quaternion, $\hat{q} = [1,0,0,0]$. The identity rotation quaternion corresponds to the axes of the blade frame 131 pointing along the same directions as the axes of the body frame 121. If the state vector is initialized by the identity rotation quaternion, however, the extended Kalman filter procedure needs a significant period of time (on the order of about tens of seconds) to converge to a good estimate of the state vector after start up.

To decrease this period of time, the initial rotation quaternion estimate $\hat{q}$ can be obtained by using the covariance between the dozer blade acceleration $a_{2_2}$ from the measurement vector, the dozer blade acceleration calculated from the dozer body acceleration $a_{1_1}$, and the rotation quaternion q:

$$F(q) = E\left[(q^{-1}a_{1_1}q - E(q^{-1}a_{1_1}q))^T (a_{2_2} - E(a_{2_2}))\right] \quad \text{(E28)}$$

$$\hat{q} = \underset{q}{\operatorname{argmax}} F(q), \quad \text{(E29)}$$

where E(a) refers to a mean value of a calculated over a user-specified interval of time. During the user-specified interval of time, the following conditions should be satisfied: the attitude of the dozer blade relative to the dozer body is not changing, and the dozer body is accelerating. These conditions can be detected by the accelerometers and the gyros of inertial measurement units. When these conditions are satisfied, the initial rotation estimate can be calculated, and an extended Kalman filter procedure can be subsequently performed.

For estimation of the dozer blade attitude relative to the dozer body, a measurement system, according to an embodiment of the invention, includes inertial sensors mounted on the dozer body and inertial sensors mounted on the dozer blade. In an advantageous embodiment, as discussed in further detail below, the inertial sensors mounted on the dozer body are housed in a first inertial measurement unit (IMU), and the inertial sensors mounted on the dozer blade are housed in a second IMU. In some instances, as described in further detail below, an estimate of the dozer blade position relative to the dozer body can also be determined.

For measuring the attitude of the dozer blade relative to the dozer body, the number and type of inertial sensors depends on the number of angular degrees of freedom and on the required accuracy. For one angular degree of freedom, a single accelerometer mounted on the dozer body and a single accelerometer mounted on the dozer blade can be used. For two angular degrees of freedom, two accelerometers mounted on the dozer body and two accelerometers mounted on the dozer blade can be used. For three angular degrees of freedom, three accelerometers mounted on the dozer body and three accelerometers mounted on the dozer blade can be used.

The response of accelerometers to gravitational force is used to measure the pitch and the roll of the dozer blade relative to the dozer body, and the response of accelerometers to dynamic motions is used to measure the yaw of the dozer blade relative to the dozer body. Accelerometers are robust and operate reliably under harsh environmental conditions (such as shock and vibration) and provide highly accurate attitude calculations (less than one arc degree, which results in an accuracy of the calculation of the dozer blade position relative to the dozer body of less than one centimeter). Calculating yaw from the response of accelerations to dynamic motions is more accurate than calculating yaw from a magnetic sensor because, as discussed previously, magnetic sensors do not operate reliably under harsh environmental conditions and are sensitive to nearby magnetic objects.

Gyros filter spurious noise and improve accuracy. For lowest noise and highest accuracy, typically each accelerometer is paired with a corresponding gyro. The combination of gyros and accelerometers in an IMU is advantageous. For mounting outside the protected environment of the cabin, an IMU has a number of advantages over other sensors. An IMU can be packaged in a compact, robust housing that can be mounted directly on the dozer blade; no support mast is needed. The IMU and mount are therefore resistant to damage from shock, vibration, and impact with dirt, stones, and rocks. Data cables and power cables running to the IMU on the dozer blade are more robust than coax cables running to GNSS antennas mounted on the dozer blade. In some installations, cables running to the IMU on the dozer blade can be eliminated altogether: data is transmitted from the IMU over a wireless interface, and power is supplied by a battery contained within the IMU housing.

Refer to FIG. 1. An IMU1 120 is mounted on the dozer body 102 (typically within the cabin 102C), and an IMU2 130 is mounted on the dozer blade 108 (typically on the back side of the dozer blade 108). If the cabin 102C has a suspension, then the IMU1 120 should be mounted on the mainframe 102F to avoid spurious influences of cabin vibration to the IMU1 120. The IMU1 120 and the IMU2 130 communicate with a controller unit 140 (typically mounted within the cabin 102C) via a communications network 402 (see FIG. 4). Data can be transmitted, for example, via wired or wireless communications links. A hydraulic control system 410 communicates with the controller unit 140 via the communications network 402. The hydraulic control system 410 controls the hydraulic lift cylinders that control the position and the attitude of the dozer blade 108.

Figure 2A:
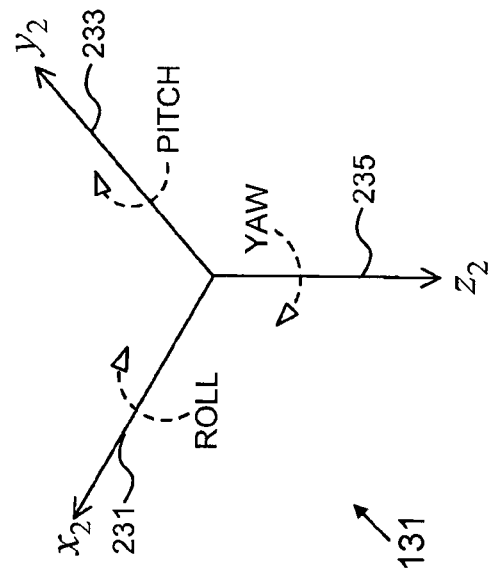
FIG. 2A and FIG. 2B show Cartesian reference frames.
Figure 5:
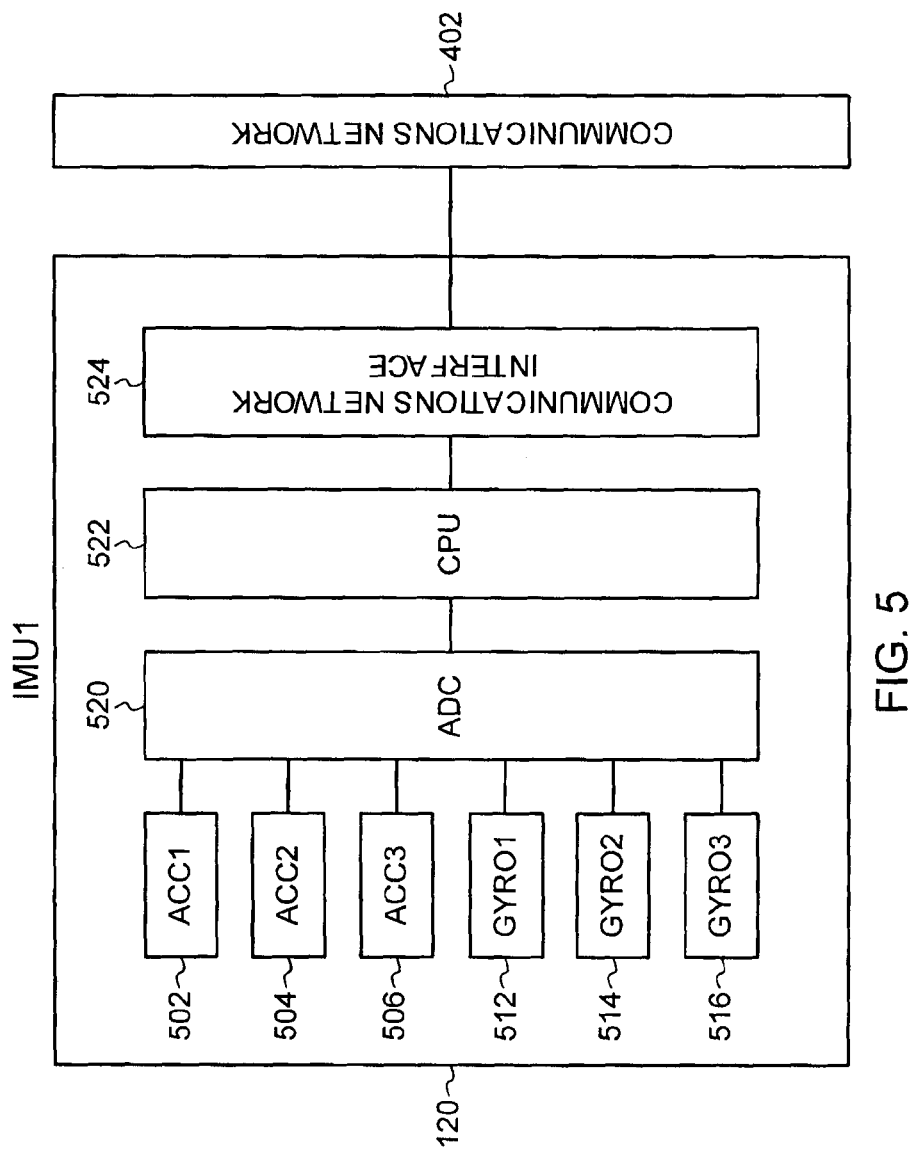
FIG. 5 shows a schematic of a first inertial measurement unit.

FIG. 5 shows a schematic of the IMU1 120. It includes three accelerometers (ACC1 502, ACC2 504, and ACC3 506) and three gyros (gyro1 512, gyro2 514, and gyro3 516). Refer to FIG. 2A. ACC1 502 measures the acceleration $a_{x_1}$ along the $x_1$-axis 221; ACC2 504 measures the acceleration $a_{y_1}$ along the $y_1$-axis 223; and ACC3 506 measures the acceleration $a_{z_1}$ along the $z_1$-axis 225. Gyro1 512 measures the angular velocity $\omega_{x_1}$ about the $x_1$-axis; gyro2 514 measures the angular velocity $\omega_{y_1}$ about the $y_1$-axis; and gyro3 516 measures the angular velocity $\omega_{z_1}$ about the $z_1$-axis.

Return to FIG. 5. The outputs of the accelerometers and gyros are transmitted into the input of an analog-to-digital converter (ADC) 520. The output of the ADC 520 is processed by a central processing unit (CPU) 522, which sends a data stream via a communications network interface 524 to the communications network 402. The data stream includes the acceleration vector $a_{IMU1}=[a_{x_1}, a_{y_1}, a_{z_1}]^T$ and the angular velocity vector $\omega_{IMU1}=[\omega_{x_1}, \omega_{y_1}, \omega_{z_1}]^T$.

Figure 2B:
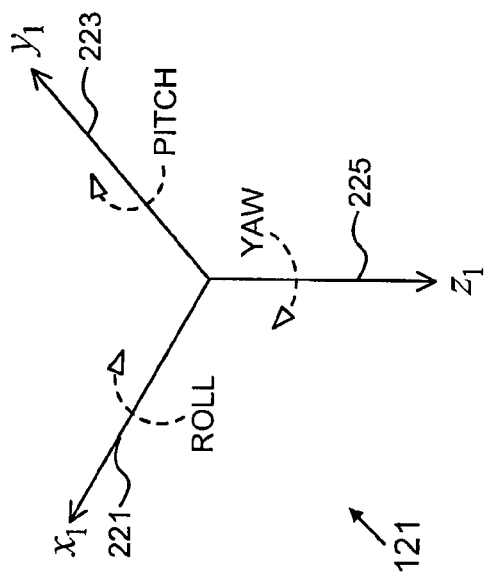
Figure 6:
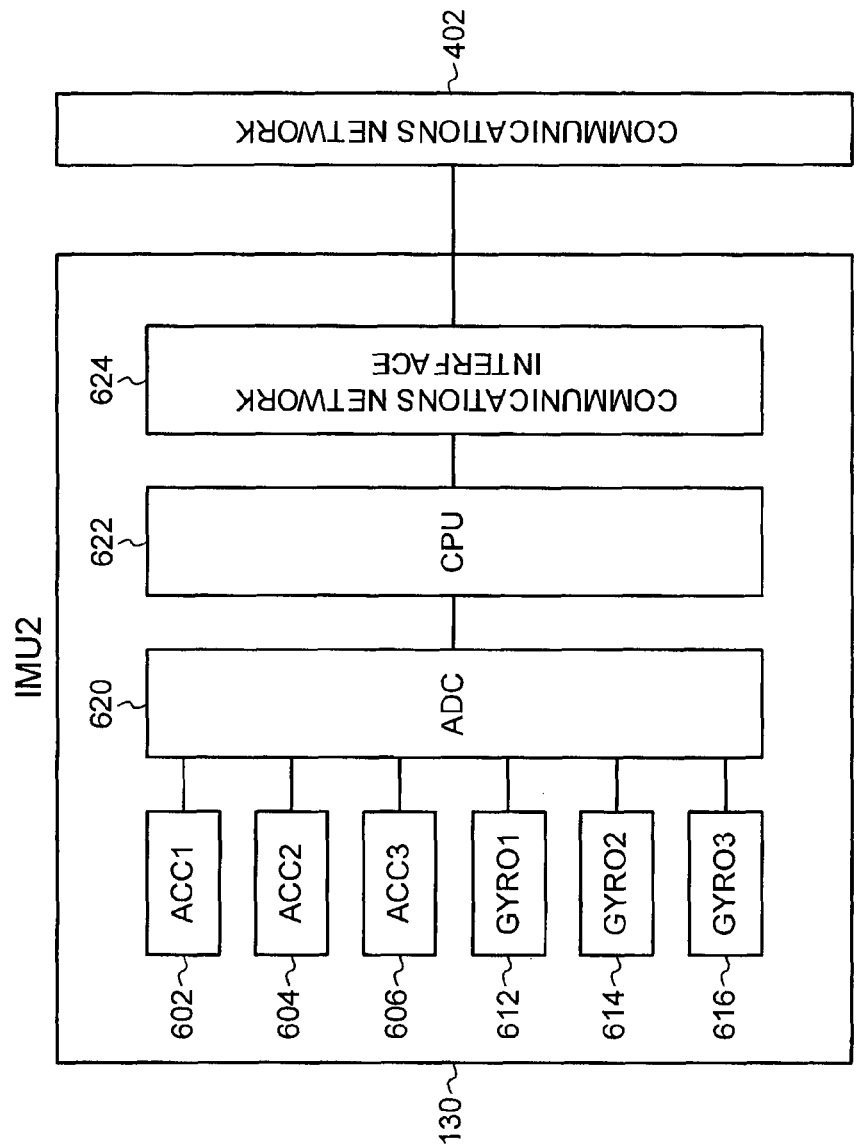
FIG. 6 shows a schematic of a second inertial measurement unit.

FIG. 6 shows a schematic of the IMU2 130. It includes three accelerometers (ACC1 602, ACC2 604, and ACC3 606) and three gyros (gyro1 612, gyro2 614, and gyro3 616). Refer to FIG. 2B. ACC1 602 measures the acceleration $a_{x_2}$ along the $x_2$-axis 231; ACC2 604 measures the acceleration $a_{y_2}$ along the $y_2$-axis 233; and ACC3 606 measures the acceleration $a_{z_2}$ along the $z_2$-axis 235. Gyro1 612 measures the angular velocity $\omega_{x_2}$ about the $x_2$-axis; gyro2 614 measures the angular velocity $\omega_{y_2}$ about the $y_2$-axis; and gyro3 616 measures the angular velocity $\omega_{z_2}$ about the $z_2$-axis.

Return to FIG. 6. The outputs of the accelerometers and gyros are transmitted into the input of an analog-to-digital converter (ADC) 620. The output of the ADC 620 is processed by a central processing unit (CPU) 622, which sends a data stream via a communications network interface 624 to the communications network 402. The data stream includes the acceleration vector $a_{IMU2}=[a_{x_2}, a_{y_2}, a_{z_2}]^T$ and the angular velocity vector $\omega_{IMU2}=[\omega_{x_2}, \omega_{y_2}, \omega_{z_2}]^T$.

Figure 4:
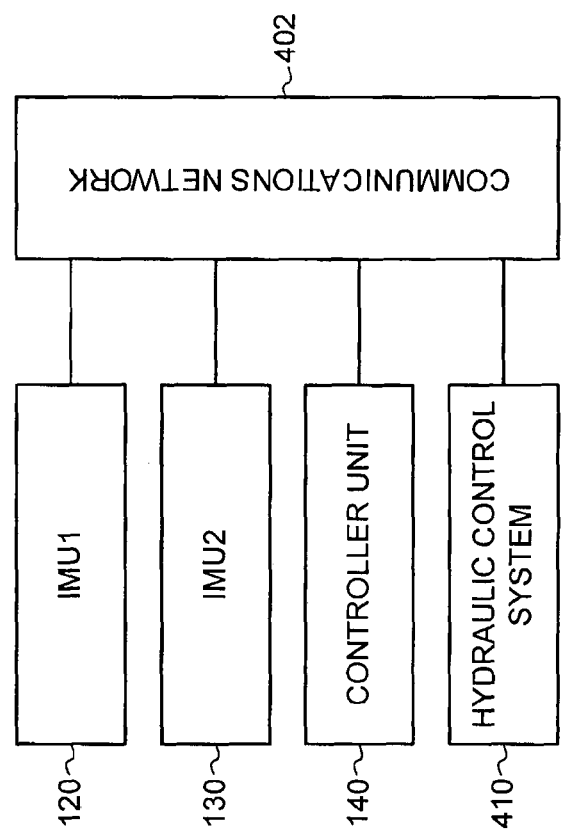
FIG. 4 shows a schematic of a control system.
Figure 7:
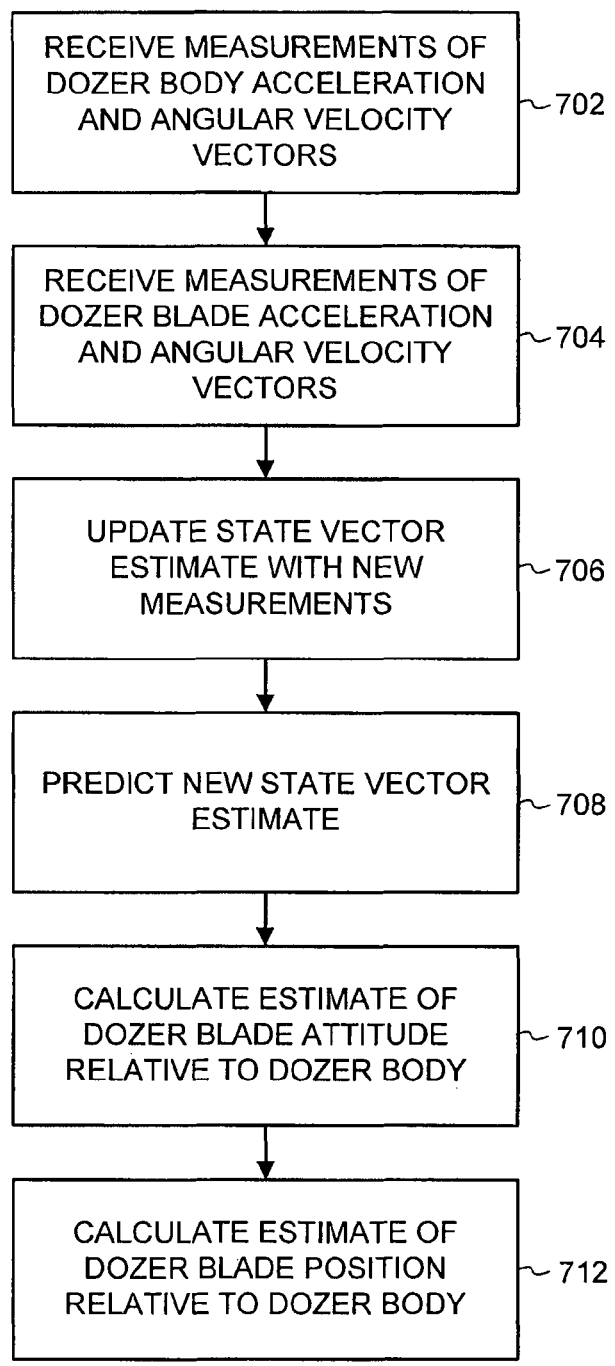
FIG. 7 shows a flowchart of a method for estimating the attitude and position of a dozer blade relative to a dozer body.

FIG. 7 shows a flowchart of a method, according to an embodiment of the invention, for estimating the attitude and position of the dozer blade relative to the dozer body. Refer to FIG. 4. In general, the IMU1 120 outputs measurements at discrete time instants relative to a reference clock in the IMU1 120; the IMU2 130 outputs measurements at discrete time instants relative to a reference clock in the IMU2 130; and the controller unit 140 processes measurements at discrete time instants relative to a reference clock in the controller unit 140. The discrete time instants are commonly referred to as epochs, and the time intervals between epochs are referred to as epoch durations. The epoch durations for the IMU1 120, the IMU2 130, and the controller unit 140 can be different or can be the same. The reference clocks in the IMU1 120, the IMU2 130, and the controller unit 140 can run asynchronously or can be synchronized to a common system time. If the reference clock in the IMU1 120 and the reference clock in the IMU2 130 are run asynchronously, then the sampling frequency of each IMU should be high enough such that the time difference between epochs from different IMUs are not more than a predetermined value defined by the required accuracy of the relative attitude; for example, a sampling frequency of 100 Hz should provide sufficient accuracy for most applications. In the embodiment shown in FIG. 7, the steps are executed iteratively at each epoch of the controller unit 140. Other embodiments, however, can use other timing sequences.

In step 702, measurements of the dozer body acceleration vector, $a_{IMU1}=[a_{x_1}, a_{y_1}, a_{z_1}]^T$, and the dozer body angular velocity vector, $\omega_{IMU1}=[\omega_{x_1}, \omega_{y_1}, \omega_{z_1}]^T$, are received. In step 704, measurements of the dozer blade acceleration vector, $a_{IMU2}=[a_{x_2}, a_{y_2}, a_{z_2}]^T$, and the dozer blade angular velocity vector, $\omega_{IMU2}=[\omega_{x_2}, \omega_{y_2}, \omega_{z_2}]^T$, are received. In practice, depending on the timing configuration, measurements from the IMU1 120 can be received before, after, or at the same time as, measurements from the IMU2 130.

The process then passes to step 706, in which the estimate of the state vector X is updated with the new measurements. The process then passes to step 708 in which an estimate of the new state vector $$X=[q_0,q_1,q_2,q_3,a_{1x_1},a_{1y_1},a_{1z_1},\omega_{1x_1},\omega_{1y_1},\omega_{1z_1},\omega_{21x_1},\omega_{21y_1},\omega_{21z_1}]^T$$

at the next epoch is predicted using (E26). The process then passes to step 710, in which an estimate of the dozer blade attitude relative to the dozer body is calculated from the estimate of the rotation quaternion $\hat{q}$ (extracted from components of X).

The process then passes to step 712, in which an estimate of the dozer blade position relative to the dozer body is calculated. To calculate the dozer blade position relative to the dozer body from the values of the dozer blade attitude relative to the dozer body (calculated in step 710), geometrical parameters of the dozer body and of the dozer blade are needed. These geometrical parameters can be entered into the controller unit 140 via a user input device or stored in a data storage device in the controller unit 140 (more details are given below). Examples of geometrical parameters include (see FIG. 1) dimensions of the dozer blade 108, dimensions of the left support arm 110L, dimensions of the right support arm 110R, position at which the left support arm 110L is coupled to the dozer blade 108, position at which the left support arm 110L is coupled to the mainframe 102F, position at which the right support arm 110R is coupled to the dozer blade 108, and position at which the right support arm 110R is coupled to the mainframe 102F.

As discussed earlier, gyros filter spurious noise and improve accuracy. In applications in which higher levels of noise and lower accuracy are acceptable, an estimate of the attitude of a dozer blade relative to a dozer body can be calculated from accelerometer measurements without gyro measurements. The algorithms for a dozer blade with three angular degrees of freedom and the algorithms for a dozer blade with one angular degree of freedom are described below.

For a dozer blade with three angular degrees of freedom, the measurement vector for time epoch $t_k$ is given by $$Z_k=[1,a_{1x_1k},a_{1y_1k},a_{1z_1k},a_{2x_2k},a_{2y_2k},a_{2z_2k}]^T. \quad (E30)$$

In (E30), the leading element "1" refers to the square norm of the quaternion; see (E8). The state vector for time epoch $t_k$ is given by $$X_k=[q_{0k},q_{1k},q_{2k},q_{3k},a_{1x_1k},a_{1y_1k},a_{1z_1k}]^T, \quad (E31)$$

when the dozer blade attitude relative to the dozer body is represented by a quaternion q as previously expressed in (E8). Then, $$a_{2k}=q_k a_{1k} q_k^{-1}. \quad (E32)$$

From (E17), $\chi_{k+1}=\chi_k+w_k$; and from (E18),

-continued $$Z_k = h(\chi_k) + v_k = $$ (E33)

$$\begin{bmatrix} q_{0k}^2 + q_{1k}^2 + q_{2k}^2 + q_{3k}^2 \\ a_{x_1 k} \\ a_{y_1 k} \\ a_{z_1 k} \\ \begin{pmatrix} q_{0k}q_{0k} + q_{1k}q_{1k} - \\ q_{2k}q_{2k} - q_{3k}q_{3k} \end{pmatrix} a_{x_1 k} + \\ 2(q_{1k}q_{2k} - q_{0k}q_{3k})a_{y_1 k} + 2(q_{1k}q_{3k} + q_{0k}q_{2k})a_{z_1 k} \\ 2(q_{1k}q_{2k} + q_{0k}q_{3k})a_{x_1 k} + \\ \begin{pmatrix} q_{0k}q_{0k} - q_{1k}q_{1k} + \\ q_{2k}q_{2k} - q_{3k}q_{3k} \end{pmatrix} a_{y_1 k} + 2(q_{2k}q_{3k} - q_{0k}q_{1k})a_{z_1 k} \\ 2(q_{1k}q_{3k} - q_{0k}q_{2k})a_{x_1 k} + \\ 2(q_{2k}q_{3k} + q_{0k}q_{1k})a_{y_1 k} + \begin{pmatrix} q_{0k}q_{0k} - q_{1k}q_{1k} - \\ q_{2k}q_{2k} + q_{3k}q_{3k} \end{pmatrix} a_{z_1 k} \end{bmatrix} + v_k.$$

For a dozer blade with one angular degree of freedom, the measurement vector for time epoch $t_k$ is given by $$Z_k = [a_{x_1 k}, a_{y_1 k}];$$ (E34)

and the state vector for time epoch $t_k$ is given by $$\chi_k = [\psi_k, a_{x_1 k}],$$ (E35)

where $\psi$ is an angle between the $x_1$-axis and the $x_2$-axis. From (E17), $\chi_{k+1} = \chi_k + w_k$; and from (E18), $$Z_k = h(\chi_k) + v_k = \begin{bmatrix} a_{x_1 k} \\ -a_{x_1 k} \sin\psi_k \end{bmatrix} + v_k.$$ (E36)

An embodiment of a controller unit 140 is shown in FIG. 8. The controller unit 140 can be installed in the cabin 102C (FIG. 1). The controller unit 140 can be configured, programmed, and operated by a control engineer or dozer operator (the dozer operator can be restricted to only a subset of functions). One skilled in the art can construct the controller unit 140 from various combinations of hardware, firmware, and software. One skilled in the art can construct the controller unit 140 from various electronic components, including one or more general purpose processors (such as microprocessors), one or more digital signal processors, one or more application-specific integrated circuits (ASICs), and one or more field-programmable gate arrays (FPGAs).

The controller unit 140 includes a computer 802, which includes a processor [referred to as a central processing unit (CPU)] 804, memory 806, and a data storage device 808. The data storage device 808 includes at least one persistent, non-transitory, tangible computer readable medium, such as non-volatile semiconductor memory, a magnetic hard drive, or a compact disc read only memory.

The controller unit 140 further includes a communications network interface 820, which interfaces the computer 802 with the communications network 402. As described above with reference to FIG. 4, the controller unit 140 can communicate with the IMU1 120, the IMU2 130, and the hydraulic control system 410 via the communications network 402. The communications network 402 can further provide communications with a local area network or a wide area network. A user can access the computer 802 via a remote access terminal (not shown) communicating with the communications network 402. Data, including computer executable code, can be transferred to and from the computer 802 via the communications network interface 820.

The controller unit 140 can further include a user input/output interface 810, which interfaces the computer 802 to user input/output devices 812. Examples of user input/output devices 812 include a keyboard, a mouse, a local access terminal, and a video display. Data, including computer executable code, can be transferred to and from the computer 802 via the user input/output interface 810.

Each of the interfaces described above can operate over different communications media. Examples of communications media include wires, free-space optics, and electromagnetic waves (typically in the radiofrequency range and commonly referred to as a wireless interface).

As is well known, a computer operates under control of computer software, which defines the overall operation of the computer and applications. The CPU 804 controls the overall operation of the computer and applications by executing computer program instructions that define the overall operation and applications. The computer program instructions can be stored in the data storage device 808 and loaded into the memory 806 when execution of the program instructions is desired. The algorithm shown schematically in FIG. 7 can be defined by computer program instructions stored in the memory 806 or in the data storage device 808 (or in a combination of the memory 806 and the data storage device 808) and controlled by the CPU 804 executing the computer program instructions. For example, the computer program instructions can be implemented as computer executable code programmed by one skilled in the art to perform algorithms. Accordingly, by executing the computer program instructions, the CPU 804 executes the algorithm shown schematically in FIG. 7.

In the discussion above, a dozer including a dozer body and a dozer blade operably coupled to the dozer body was used as an example of a machine for which embodiments of the invention can be applied. Embodiments of the invention can be used for other earthmoving machines; for example, a motorgrader including a motorgrader body (frame) and a motorgrader blade operably coupled to the motorgrader body. In general, embodiments of the invention can be used for a vehicle including a vehicle body and an implement operably coupled to the vehicle body; for example, the vehicle can be a paver with a paver body, and the implement can be a screed operably coupled to the paver body. An implement operably coupled to a vehicle body refers to an implement whose attitude relative to the vehicle body can be varied and controlled, either manually by an operator or automatically by a control system. In general, both the attitude and the position of the implement relative to the vehicle body can be varied and controlled.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for estimating an attitude in a plurality of attitudes of an implement operably coupled to a vehicle body, the implement having an implement acceleration and the vehicle body having a body acceleration, wherein each attitude in the plurality of attitudes corresponds to a time instant in a plurality of time instants, the method comprising the steps of:
- receiving a body acceleration measurement from a body accelerometer mounted on the vehicle body;
- receiving an implement acceleration measurement from an implement accelerometer mounted on the implement;
- calculating a first state vector estimate corresponding to a first time instant in the plurality of time instants, wherein:
  - the first state vector estimate is based at least in part on the body acceleration measurement and the implement acceleration measurement, and is calculated by calculating a measurement vector based at least in part on the body acceleration measurement and the implement acceleration measurement and performing an extended Kalman filter procedure on the measurement vector; and
  - the first state vector estimate comprises a representation of a first attitude of the implement relative to the vehicle body, the representation being a rotation quaternion q given by:

$$q=[q_0,q_1,q_2,q_3], (q_0^2+q_1^2+q_2^2+q_3^2=1).$$

2. The method of claim 1, further comprising the step of:
calculating an estimate of a position of the implement relative to the vehicle body based at least in part on the representation of the first attitude of the implement relative to the vehicle body.

3. The method of claim 1, further comprising the step of:
predicting a second state vector estimate corresponding to a second time instant in the plurality of time instants, wherein:
- the second state vector estimate is based at least in part on the first state vector estimate and a time-dependent system model; and
- the second state vector estimate comprises a representation of a second attitude of the implement relative to the vehicle body, the representation being a rotation quaternion q given by:

$$q=[q_0,q_1,q_2,q_3], (q_0^2+q_1^2+q_2^2+q_3^2=1).$$

4. The method of claim 1, further comprising the steps of:
receiving a body angular velocity measurement from a body gyro mounted on the vehicle body; and
receiving an implement angular velocity measurement from an implement gyro mounted on the implement;
wherein the first state vector estimate is further based at least in part on the body angular velocity measurement and the implement angular velocity measurement.

5. The method of claim 4, further comprising the steps of:
calculating a measurement vector based at least in part on the body acceleration measurement, the implement acceleration measurement, the body angular velocity measurement, and the implement angular velocity measurement; and
calculating the first state vector estimate by performing an extended Kalman filter procedure on the measurement vector.

6. The method of claim 1, wherein the body acceleration measurement is a first body acceleration measurement, the body accelerometer is a first body accelerometer, the implement acceleration measurement is a first implement acceleration measurement, and the implement accelerometer is a first implement accelerometer, further comprising the steps of:

receiving a second body acceleration measurement from a second body accelerometer mounted on the vehicle body; and
receiving a second implement acceleration measurement from a second implement accelerometer mounted on the implement;
wherein the first state vector estimate is further based at least in part on the second body acceleration measurement and the second implement acceleration measurement.

7. The method of claim 6, further comprising the steps of:
calculating a measurement vector based at least in part on the first body acceleration measurement, the second body acceleration measurement, the first implement acceleration measurement, and the second implement acceleration measurement; and
calculating the first state vector estimate by performing an extended Kalman filter procedure on the measurement vector.

8. The method of claim 6, further comprising the steps of:
receiving a first body angular velocity measurement from a first body gyro mounted on the vehicle body;
receiving a second body angular velocity measurement from a second body gyro mounted on the vehicle body;
receiving a first implement angular velocity measurement from a first implement gyro mounted on the implement; and
receiving a second implement angular velocity measurement from a second implement gyro mounted on the implement;
wherein the first state vector estimate is further based at least in part on the first body angular velocity measurement, the second body angular velocity measurement, the first implement angular velocity measurement, and the second implement angular velocity measurement.

9. The method of claim 8, further comprising the steps of:
calculating a measurement vector based at least in part on the first body acceleration measurement, the second body acceleration measurement, the first implement acceleration measurement, the second implement acceleration measurement, the first body angular velocity measurement, the second body angular velocity measurement, the first implement angular velocity measurement, and the second implement angular velocity measurement; and
calculating the first state vector estimate by performing an extended Kalman filter procedure on the measurement vector.

10. The method of claim 6, further comprising the steps of:
receiving a third body acceleration measurement from a third body accelerometer mounted on the vehicle body; and
receiving a third implement acceleration measurement from a third implement accelerometer mounted on the implement;
wherein the first state vector estimate is further based at least in part on the third body acceleration measurement and the third implement acceleration measurement.

11. The method of claim 10, further comprising the steps of:
calculating a measurement vector based at least in part on the first body acceleration measurement, the second body acceleration measurement, the third body acceleration measurement, the first implement acceleration measurement, the second implement acceleration measurement, and the third implement acceleration measurement; and calculating the first state vector estimate by performing an extended Kalman filter procedure on the measurement vector.

12. The method of claim 10, further comprising the steps of:
receiving a first body angular velocity measurement from a first body gyro mounted on the vehicle body;
receiving a second body angular velocity measurement from a second body gyro mounted on the vehicle body;
receiving a third body angular velocity measurement from a third body gyro mounted on the vehicle body;
receiving a first implement angular velocity measurement from a first implement gyro mounted on the implement;
receiving a second implement angular velocity measurement from a second implement gyro mounted on the implement; and
receiving a third implement angular velocity measurement from a third implement gyro mounted on the implement;
wherein the first state vector estimate is further based at least in part on the first body angular velocity measurement, the second body angular velocity measurement, the third body angular velocity measurement, the first implement angular velocity measurement, the second implement angular velocity measurement, and the third implement angular velocity measurement.

13. The method of claim 12, further comprising the steps of:
calculating a measurement vector based at least in part on the first body acceleration measurement, the second body acceleration measurement, the third body acceleration measurement, the first implement acceleration measurement, the second implement acceleration measurement, the third implement acceleration measurement, the first body angular velocity measurement, the second body angular velocity measurement, the third body angular velocity measurement, the first implement angular velocity measurement, the second implement angular velocity measurement, and the third implement angular velocity measurement; and
calculating the first state vector estimate by performing an extended Kalman filter procedure on the measurement vector.

14. An apparatus for estimating an attitude in a plurality of attitudes of an implement operably coupled to a vehicle body, the implement having an implement acceleration and the vehicle body having a body acceleration, wherein each attitude in the plurality of attitudes corresponds to a time instant in a plurality of time instants, the apparatus comprising:
means for receiving a body acceleration measurement from a body accelerometer mounted on the vehicle body;
means for receiving an implement acceleration measurement from an implement accelerometer mounted on the implement;
means for calculating a first state vector estimate corresponding to a first time instant in the plurality of time instants, wherein:
the first state vector estimate is based at least in part on the body acceleration measurement and the implement acceleration measurement, and is calculated by calculating a measurement vector based at least in part on the body acceleration measurement and the implement acceleration measurement and performing an extended Kalman filter procedure on the measurement vector; and the first state vector estimate comprises a representation of a first attitude of the implement relative to the vehicle body, the representation being a rotation quaternion q given by:

$$q=[q_0,q_1,q_2,q_3],(q_0^2+q_1^2+q_2^2+q_3^2=1).$$

15. The apparatus of claim 14, further comprising:
means for calculating an estimate of a position of the implement relative to the vehicle body based at least in part on the representation of the first attitude of the implement relative to the vehicle body.

16. The apparatus of claim 14, further comprising:
means for predicting a second state vector estimate corresponding to a second time instant in the plurality of time instants, wherein:
the second state vector estimate is based at least in part on the first state vector estimate and a time-dependent system model; and
the second state vector estimate comprises a representation of a second attitude of the implement relative to the vehicle body, the representation being a rotation quaternion q given by:

$$q=[q_0,q_1,q_2,q_3],(q_0^2+q_1^2+q_2^2+q_3^2=1).$$

17. The apparatus of claim 14, further comprising:
means for receiving a body angular velocity measurement from a body gyro mounted on the vehicle body; and
means for receiving an implement angular velocity measurement from an implement gyro mounted on the implement;
wherein the first state vector estimate is further based at least in part on the body angular velocity measurement and the implement angular velocity measurement.

18. The apparatus of claim 17, further comprising:
means for calculating a measurement vector based at least in part on the body acceleration measurement, the implement acceleration measurement, the body angular velocity measurement, and the implement angular velocity measurement; and
means for calculating the first state vector estimate by performing an extended Kalman filter procedure on the measurement vector.

19. The apparatus of claim 14, wherein the body acceleration measurement is a first body acceleration measurement, the body accelerometer is a first body accelerometer, the implement acceleration measurement is a first implement acceleration measurement, and the implement accelerometer is a first implement accelerometer, further comprising:
means for receiving a second body acceleration measurement from a second body accelerometer mounted on the vehicle body; and
means for receiving a second implement acceleration measurement from a second implement accelerometer mounted on the implement;
wherein the first state vector estimate is further based at least in part on the second body acceleration measurement and the second implement acceleration measurement.

20. The apparatus of claim 19, further comprising:
means for calculating a measurement vector based at least in part on the first body acceleration measurement, the second body acceleration measurement, the first implement acceleration measurement, and the second implement acceleration measurement; and
means for calculating the first state vector estimate by performing an extended Kalman filter procedure on the measurement vector.

21. The apparatus of claim 19, further comprising:
means for receiving a first body angular velocity measurement from a first body gyro mounted on the vehicle body;
means for receiving a second body angular velocity measurement from a second body gyro mounted on the vehicle body;
means for receiving a first implement angular velocity measurement from a first implement gyro mounted on the implement; and
means for receiving a second implement angular velocity measurement from a second implement gyro mounted on the implement;
wherein the first state vector estimate is further based at least in part on the first body angular velocity measurement, the second body angular velocity measurement, the first implement angular velocity measurement, and the second implement angular velocity measurement.

22. The apparatus of claim 21, further comprising:
means for calculating a measurement vector based at least in part on the first body acceleration measurement, the second body acceleration measurement, the first implement acceleration measurement, the second implement acceleration measurement, the first body angular velocity measurement, the second body angular velocity measurement, the first implement angular velocity measurement, and the second implement angular velocity measurement; and
means for calculating the first state vector estimate by performing an extended Kalman filter procedure on the measurement vector.

23. The apparatus of claim 19, further comprising:
means for receiving a third body acceleration measurement from a third body accelerometer mounted on the vehicle body; and
means for receiving a third implement acceleration measurement from a third implement accelerometer mounted on the implement;
wherein the first state vector estimate is further based at least in part on the third body acceleration measurement and the third implement acceleration measurement.

24. The apparatus of claim 23, further comprising:
means for calculating a measurement vector based at least in part on the first body acceleration measurement, the second body acceleration measurement, the third body acceleration measurement, the first implement acceleration measurement, the second implement acceleration measurement, and the third implement acceleration measurement; and
means for calculating the first state vector estimate by performing an extended Kalman filter procedure on the measurement vector.

25. The apparatus of claim 23, further comprising:
means for receiving a first body angular velocity measurement from a first body gyro mounted on the vehicle body;
means for receiving a second body angular velocity measurement from a second body gyro mounted on the vehicle body;
means for receiving a third body angular velocity measurement from a third body gyro mounted on the vehicle body;
means for receiving a first implement angular velocity measurement from a first implement gyro mounted on the implement;
means for receiving a second implement angular velocity measurement from a second implement gyro mounted on the implement; and
means for receiving a third implement angular velocity measurement from a third implement gyro mounted on the implement;
wherein the first state vector estimate is further based at least in part on the first body angular velocity measurement, the second body angular velocity measurement, the third body angular velocity measurement, the first implement angular velocity measurement, the second implement angular velocity measurement, and the third implement angular velocity measurement.

26. The apparatus of claim 25, further comprising:
means for calculating a measurement vector based at least in part on the first body acceleration measurement, the second body acceleration measurement, the third body acceleration measurement, the first implement acceleration measurement, the second implement acceleration measurement, the third implement acceleration measurement, the first body angular velocity measurement, the second body angular velocity measurement, the third body angular velocity measurement, the first implement angular velocity measurement, the second implement angular velocity measurement, and the third implement angular velocity measurement; and
means for calculating the first state vector estimate by performing an extended Kalman filter procedure on the measurement vector.

27. A computer readable medium storing computer program instructions for estimating an attitude in a plurality of attitudes of an implement operably coupled to a vehicle body, the implement having an implement acceleration and the vehicle body having a body acceleration, wherein each attitude in the plurality of attitudes corresponds to a time instant in a plurality of time instants, the computer program instructions defining the steps of:
receiving a body acceleration measurement from a body accelerometer mounted on the vehicle body;
receiving an implement acceleration measurement from an implement accelerometer mounted on the implement;
calculating a first state vector estimate corresponding to a first time instant in the plurality of time instants, wherein:
the first state vector estimate is based at least in part on the body acceleration measurement and the implement acceleration measurement, and is calculated by calculating a measurement vector based at least in part on the body acceleration measurement and the implement acceleration measurement and performing an extended Kalman filter procedure on the measurement vector; and
the first state vector estimate comprises a representation of a first attitude of the implement relative to the vehicle body, the representation being a rotation quaternion q given by:

$$q=[q_0,q_1,q_2,q_3],(q_0^2+q_1^2+q_2^2+q_3^2=1).$$

28. The computer readable medium of claim 27, wherein the computer program instructions further comprise computer program instructions defining the step of:
calculating an estimate of a position of the implement relative to the vehicle body based at least in part on the representation of the first attitude of the implement relative to the vehicle body.

29. The computer readable medium of claim 27, wherein the computer program instructions further comprise computer program instructions defining the step of:
predicting a second state vector estimate corresponding to a second time instant in the plurality of time instants, wherein:
the second state vector estimate is based at least in part on the first state vector estimate and a time-dependent system model; and
the second state vector estimate comprises a representation of a second attitude of the implement relative to the vehicle body, the representation being a rotation quaternion q given by:

$$q=[q_0,q_1,q_2,q_3], (q_0^2+q_1^2+q_2^2+q_3^2=1).$$

30. The computer readable medium of claim 27, wherein the computer program instructions further comprise computer program instructions defining the steps of:
receiving a body angular velocity measurement from a body gyro mounted on the vehicle body; and
receiving an implement angular velocity measurement from an implement gyro mounted on the implement;
wherein the first state vector estimate is further based at least in part on the body angular velocity measurement and the implement angular velocity measurement.

31. The computer readable medium of claim 30, wherein the computer program instructions further comprise computer program instructions defining the steps of:
calculating a measurement vector based at least in part on the body acceleration measurement, the implement acceleration measurement, the body angular velocity measurement, and the implement angular velocity measurement; and
calculating the first state vector estimate by performing an extended Kalman filter procedure on the measurement vector.

32. The computer readable medium of claim 27, wherein the body acceleration measurement is a first body acceleration measurement, the body accelerometer is a first body accelerometer, the implement acceleration measurement is a first implement acceleration measurement, and the implement accelerometer is a first implement accelerometer, and wherein the computer program instructions further comprise computer program instructions defining the steps of:
receiving a second body acceleration measurement from a second body accelerometer mounted on the vehicle body; and
receiving a second implement acceleration measurement from a second implement accelerometer mounted on the implement;
wherein the first state vector estimate is further based at least in part on the second body acceleration measurement and the second implement acceleration measurement.

33. The computer readable medium of claim 32, wherein the computer program instructions further comprise computer program instructions defining the steps of:
calculating a measurement vector based at least in part on the first body acceleration measurement, the second body acceleration measurement, the first implement acceleration measurement, and the second implement acceleration measurement; and
calculating the first state vector estimate by performing an extended Kalman filter procedure on the measurement vector.

34. The computer readable medium of claim 32, wherein the computer program instructions further comprise computer program instructions defining the steps of:
receiving a first body angular velocity measurement from a first body gyro mounted on the vehicle body;
receiving a second body angular velocity measurement from a second body gyro mounted on the vehicle body;
receiving a first implement angular velocity measurement from a first implement gyro mounted on the implement; and
receiving a second implement angular velocity measurement from a second implement gyro mounted on the implement;
wherein the first state vector estimate is further based at least in part on the first body angular velocity measurement, the second body angular velocity measurement, the first implement angular velocity measurement, and the second implement angular velocity measurement.

35. The computer readable medium of claim 34, wherein the computer program instructions further comprise computer program instructions defining the steps of:
calculating a measurement vector based at least in part on the first body acceleration measurement, the second body acceleration measurement, the first implement acceleration measurement, the second implement acceleration measurement, the first body angular velocity measurement, the second body angular velocity measurement, the first implement angular velocity measurement, and the second implement angular velocity measurement; and
calculating the first state vector estimate by performing an extended Kalman filter procedure on the measurement vector.

36. The computer readable medium of claim 32, wherein the computer program instructions further comprise computer program instructions defining the steps of:
receiving a third body acceleration measurement from a third body accelerometer mounted on the vehicle body; and
receiving a third implement acceleration measurement from a third implement accelerometer mounted on the implement;
wherein the first state vector estimate is further based at least in part on the third body acceleration measurement and the third implement acceleration measurement.

37. The computer readable medium of claim 36, further wherein the computer program instructions further comprise computer program instructions defining the steps of:
calculating a measurement vector based at least in part on the first body acceleration measurement, the second body acceleration measurement, the third body acceleration measurement, the first implement acceleration measurement, the second implement acceleration measurement, and the third implement acceleration measurement; and
calculating the first state vector estimate by performing an extended Kalman filter procedure on the measurement vector.

38. The computer readable medium of claim 36, wherein the computer program instructions further comprise computer program instructions defining the steps of:
receiving a first body angular velocity measurement from a first body gyro mounted on the vehicle body;
receiving a second body angular velocity measurement from a second body gyro mounted on the vehicle body;
receiving a third body angular velocity measurement from a third body gyro mounted on the vehicle body;

receiving a first implement angular velocity measurement from a first implement gyro mounted on the implement;

receiving a second implement angular velocity measurement from a second implement gyro mounted on the implement; and receiving a third implement angular velocity measurement from a third implement gyro mounted on the implement;

wherein the first state vector estimate is further based at least in part on the first body angular velocity measurement, the second body angular velocity measurement, the third body angular velocity measurement, the first implement angular velocity measurement, the second implement angular velocity measurement, and the third implement angular velocity measurement.

39. The computer readable medium of claim 38, wherein the computer program instructions further comprise computer program instructions defining the steps of:

calculating a measurement vector based at least in part on the first body acceleration measurement, the second body acceleration measurement, the third body acceleration measurement, the first implement acceleration measurement, the second implement acceleration measurement, the third implement acceleration measurement, the first body angular velocity measurement, the second body angular velocity measurement, the third body angular velocity measurement, the first implement angular velocity measurement, the second implement angular velocity measurement, and the third implement angular velocity measurement; and calculating the first state vector estimate by performing an extended Kalman filter procedure on the measurement vector.

* * * * *